United States Patent Office 2,844,591
Patented July 22, 1958

2,844,591

1-SUBSTITUTED-3-PYRROLIDYLMETHYL BENZILATES AND SALTS THEREOF

Rolland Frederick Feldkamp and Yao Hua Wu, Evansville, Ind., assignors to Mead Johnson & Company, Evansville, Ind., a corporation of Indiana No Drawing. Application October 14, 1955
Serial No. 540,606

14 Claims. (Cl. 260—326.3)

This invention relates to 1-substituted - 3 - pyrrolidylmethyl benzilates and the salts thereof and has more particular reference to a new class of compounds having the general formula:

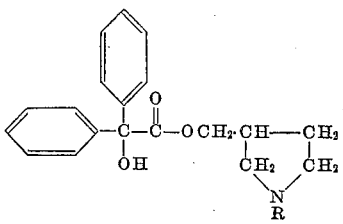

wherein R is selected from the group consisting of alkyl, alkenyl, aryl and aralkyl and the acid addition and quaternary ammonium salts of such compounds.

The compounds of this invention have useful pharmacological properties and are particularly useful since they have high antispasmodic activity when administered as the free base or as the acid addition or quaternary ammonium salt. When used therapeutically these compounds may be administered orally as tablets, capsules or elixirs and if in aqueous solution they may be administered parenterally or by drop dosage. The size of the dose for an individual will depend upon the particular compound used and the therapeutic effect desired and the dose may vary between 0.3 to 30 milligrams.

The compouns of this invention may be readily prepared by esterification of a 1-substituted-3-pyrrolidylmethyl alcohol with benzilic acid or with a benzilic acid ester by ester exchange, such esterification procedures being generally well known in the art.

The 1-substituted-3-pyrollidylmethyl alcohols that are esterified to produce the compounds of this invention are specifically disclosed in our copending application Serial No. 540,604, filed of even date herewith, and include those compounds in which the substituent in the 1 position is an alkyl, alkenyl, aryl or aralkyl group, such as methyl, ethyl, n-propyl, isopropyl, butyl, allyl, phenyl, benzyl and the like.

For a more complete understanding of this invention reference will now be made to a specific procedure for preparing the herein claimed compounds.

*1-methyl-3-pyrrolidylmethyl benzilate.*—A mixture of 242 parts of methyl benzilate, 115 parts of 1-methyl - 3 - pyrrolidylmethyl alcohol (prepared in accordance with the procedure outlined in our copending application Serial No. 540,604), one part of metallic sodium and 685 parts of n-heptane was placed in a suitable distilling flask. The flask is connected through a Dean and Stark apparatus to a condenser and the suspension refluxed for four hours. During this period 32 parts of methyl alcohol were evolved and separated from the azeotropic condensate. The hot clear heptane reaction solution was decanted from insoluble material and cooled to room temperature, whereby crude 1-methyl-3-pyrrolidylmethyl benzilate separated and was collected by filtration. The ester was purified by two recrystallizations from 2000 parts of n-heptane. Yield of benzilate was 165 parts.

*1-methyl-3-pyrrolidylmethyl benzilate hydrochloride.*—A solution of 9.75 parts of pure 1-methyl-3-pyrrolidylmethyl benzilate in 31.5 parts of 0.1 N methanolic hydrochloric acid was diluted with 109 parts of anhydrous ether and place in an ice box overnight. The hydrochloride crystallized in small needles. After collecting and drying, the hygroscopic crystals weighed 5 parts and melted at 145–147° C. Carbon: calculated 66.40%, found 66.70%. Hydrogen: calculated 6.68%, found 6.94%. Chlorine: calculated 9.80%, found 9.89%.

In the foregoing examples specific reference is made to the preparation of the 1-methyl derivative and its hydrochloride. However, it will be readily apparent that essentially the same procedure using various other 1-substituted-3-pyrrolidylmethyl alcohols and essentially the same molar ratios of reactants may be employed to prepare compounds having other substituents in the 1 position, all as previously indicated. A number of such compounds have been prepared and their properties and analyses are set forth in the following table:

TABLE

*1-substituted-3-pyrrolidylmethyl benzilates*

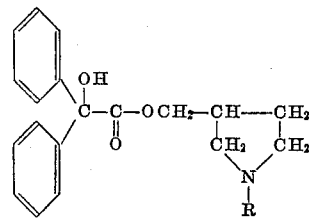

| R | M. P., °C. | Carbon | | Hydrogen | | Nitrogen | |
|---|---|---|---|---|---|---|---|
| | | Calcd. | Found | Calcd. | Found | Calcd. | Found |
| CH₃ | 132–134 | 73.80 | 73.54 | 7.12 | 6.97 | 4.31 | 4.52 |
| C₂H₅ | 73–74 | 74.31 | 74.39 | 7.42 | 7.26 | 4.13 | 4.20 |
| C₃H₇ | 70–72 | 74.75 | 74.81 | 7.70 | 7.85 | 3.96 | 3.87 |
| i-C₃H₇ | 96–97 | 74.75 | 74.91 | 7.70 | 7.50 | 3.96 | 3.80 |
| CH₂=CH—CH₂— | 86–88 | 75.18 | 75.32 | 7.17 | 7.31 | 3.99 | 3.72 |
| C₄H₉ | 67–68 | 75.17 | 75.26 | 7.95 | 7.70 | 3.81 | 4.15 |
| C₆H₅—CH₂— | 90–91.5 | 77.77 | 77.79 | 6.78 | 6.95 | 3.49 | 3.42 |

As indicated in the foregoing table, all of the compounds of this invention are solid at room temperatures which facilitates their purification. As previously pointed out, the compounds may be used as such or may be administered as the acid addition or quaternary ammonium salts. Examples of suitable acid addition salts are the hydrochlorides, hydrobromides, hydroiodides, sulfates, phosphates, maleates, acetates, citrates, succinates, tartrates and the like. Suitable quaternary ammonium salts are those that may be obtained by the addition to the basic ester of alkyl or aralkyl esters of inorganic acids or organic sulfonic acids including such compounds as methyl chloride, methyl bromide, methyl iodide, ethyl bromide, propyl chloride, benzyl chloride, benzyl bromide, methyl sulfate, methyl benzene-sulfonate, methyl paratoluenesulfonate and the like.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A member of the group consisting of a 1-substituted-3-pyrrolidylmethyl benzilate having the formula

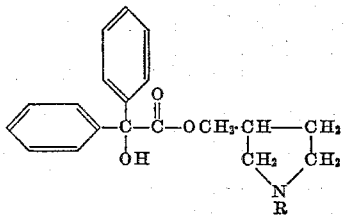

and the acid addition and quaternary ammonium salts thereof wherein R is selected from the group consisting of lower alkyl, alkenyl, and phenyl lower alkyl.

2. The 1-lower alkyl-3-pyrrolidylmethyl benzilates.
3. The acid addition salts of 1-lower alkyl-3-pyrrolidylmethyl benzilates.
4. The 1-lower alkenyl-3-pyrrolidylmethyl benzilates.
5. The acid addition salts of 1-lower alkenyl-3-pyrrolidylmethyl benzilates.
6. The 1-phenyl lower alkyl-3-pyrrolidylmethyl benzilates.
7. The acid addition salts of 1-phenyl lower alkyl-3-pyrrolidylmethyl benzilates.
8. 1-methyl-3-pyrrolidylmethyl benzilate.
9. 1-ethyl-3-pyrrolidylmethyl benzilate.
10. 1-n-propyl-3-pyrrolidylmethyl benzilate.
11. 1-isopropyl-3-pyrrolidylmethyl benzilate.
12. 1-butyl-3-pyrrolidylmethyl benzilate.
13. 1-allyl-3-pyrrolidylmethyl benzilate.
14. 1-benzyl-3-pyrrolidylmethyl benzilate.

References Cited in the file of this patent
UNITED STATES PATENTS 2,695,301    Blicke _____ Nov. 23, 1954